US008059594B2

(12) United States Patent
Cho et al.

(10) Patent No.: US 8,059,594 B2
(45) Date of Patent: Nov. 15, 2011

(54) METHOD AND APPARATUS FOR TRANSMITTING/RECEIVING SCHEDULING CHANNELS IN A WIRELESS COMMUNICATION SYSTEM

(75) Inventors: Joon-Young Cho, Suwon-si (KR); Ju-Ho Lee, Suwon-si (KR); Seong-Hun Kim, Suwon-si (KR); Young-Bum Kim, Seoul (KR); Young-Jun Kwak, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1084 days.

(21) Appl. No.: 11/862,018

(22) Filed: Sep. 26, 2007

(65) Prior Publication Data

US 2008/0076439 A1    Mar. 27, 2008

(30) Foreign Application Priority Data

Sep. 26, 2006  (KR) .................... 10-2006-0093431

(51) Int. Cl.
  *H04W 4/00*   (2009.01)
  *H04W 72/00*  (2009.01)
  *H04L 12/28*  (2006.01)

(52) U.S. Cl. ........ 370/329; 370/235; 370/252; 370/313; 370/337; 370/442; 370/208; 370/328; 370/412; 455/450; 455/509; 455/517

(58) Field of Classification Search .......... 370/228–503; 455/450–451, 500–528
See application file for complete search history.

(56) References Cited

U.S. PATENT DOCUMENTS

| | | | |
|---|---|---|---|
| 6,226,277 B1* | 5/2001 | Chuah ......................... 370/328 |
| 6,567,660 B1 | 5/2003 | Wegener | |
| 6,728,257 B1 | 4/2004 | Bharghavan et al. | |
| 6,850,540 B1* | 2/2005 | Peisa et al. .................... 370/468 |
| 6,865,185 B1* | 3/2005 | Patel et al. .................... 370/412 |
| 7,002,937 B1 | 2/2006 | Dispensa et al. | |
| 7,006,530 B2* | 2/2006 | Spinar et al. .................. 370/468 |
| 7,013,143 B2* | 3/2006 | Love et al. .................... 455/450 |
| 7,263,063 B2* | 8/2007 | Sastry et al. .................. 370/235 |
| 7,289,468 B2* | 10/2007 | Yang et al. .................... 370/329 |
| 7,304,971 B2* | 12/2007 | Balachandran et al. ...... 370/337 |
| 7,324,447 B1* | 1/2008 | Morford ....................... 370/231 |
| 7,330,433 B2* | 2/2008 | Shao et al. .................... 370/235 |
| 7,349,338 B2* | 3/2008 | Balachandran et al. ...... 370/232 |
| 7,453,821 B2* | 11/2008 | Nagaraj ....................... 370/252 |

(Continued)

FOREIGN PATENT DOCUMENTS

WO    WO 2004/038951    5/2004

*Primary Examiner* — Ayaz Sheikh
*Assistant Examiner* — Venkatesh Haliyur
(74) *Attorney, Agent, or Firm* — The Farrell Law Firm, P.C.

(57) ABSTRACT

A method and apparatus for transmitting/receiving scheduling channels in a wireless communication system supporting spectrum scalability are provided, in which scheduling bandwidth of a User Element (UE) is determined, scheduling information including index information indicating resources allocated to the UE, transport format information about data to be transmitted to the UE, and Hybrid Automatic Repeat reQuest (HARQ) information is configured if a scheduling bandwidth of the UE is equal to a system bandwidth, the scheduling information is divided into first scheduling information and second scheduling information, and each of the first scheduling information and the second scheduling information is mapped to scheduling resources corresponding to a frequency band adjacent to a center frequency of the system bandwidth and having a bandwidth equal to a minimum bandwidth of the UE, and transmitted to the UE.

17 Claims, 18 Drawing Sheets

U.S. PATENT DOCUMENTS

| | | | |
|---|---|---|---|
| 7,471,932 B2* | 12/2008 | Wu et al. | 455/91 |
| 7,499,437 B2* | 3/2009 | Das et al. | 370/338 |
| 7,548,752 B2* | 6/2009 | Sampath et al. | 455/447 |
| 7,551,546 B2* | 6/2009 | Ma et al. | 370/208 |
| 7,568,046 B2* | 7/2009 | Allen | 709/233 |
| 7,643,418 B1* | 1/2010 | Varier et al. | 370/232 |
| 7,668,188 B2* | 2/2010 | Chang et al. | 370/415 |
| 7,676,223 B2* | 3/2010 | Das et al. | 455/422.1 |
| 7,693,099 B2* | 4/2010 | Gollamudi et al. | 370/328 |
| 7,701,919 B2* | 4/2010 | Ah Lee | 370/344 |
| 7,715,837 B2* | 5/2010 | Lehtovirta et al. | 455/424 |
| 7,734,805 B2* | 6/2010 | Balachandran et al. | 709/232 |
| 7,817,605 B2* | 10/2010 | Liu | 370/337 |
| 2002/0080719 A1* | 6/2002 | Parkvall et al. | 370/235 |
| 2002/0080816 A1* | 6/2002 | Spinar et al. | 370/449 |
| 2003/0058871 A1* | 3/2003 | Sastry et al. | 370/401 |
| 2003/0185214 A1* | 10/2003 | Yang et al. | 370/395.4 |
| 2004/0156328 A1* | 8/2004 | Walton et al. | 370/313 |
| 2004/0170186 A1* | 9/2004 | Shao et al. | 370/412 |
| 2007/0047485 A1* | 3/2007 | Gorokhov et al. | 370/329 |
| 2007/0116002 A1* | 5/2007 | Nakamata | 370/394 |
| 2009/0300456 A1* | 12/2009 | Pelletier et al. | 714/749 |

\* cited by examiner

METHOD AND APPARATUS FOR TRANSMITTING/RECEIVING SCHEDULING CHANNELS IN A WIRELESS COMMUNICATION SYSTEM

PRIORITY

This application claims priority under 35 U.S.C. §119(a) to a Korean Patent Application filed in the Korean Intellectual Property Office on Sep. 26, 2006 and assigned Serial No. 2006-93431, the entire disclosure of which is hereby incorporated by reference.

BACKGROUND OF THE INVENTION

1. Field of the Invention

The present invention generally relates to a method and apparatus for transmitting/receiving scheduling channels in a wireless packet communication system. More particularly, the present invention relates to a method and apparatus for transmitting/receiving scheduling channel signals according to the reception bandwidth of a User Equipment (UE) in a system supporting spectrum scalability.

2. Description of the Related Art

A multi-access wireless communication system needs to enable a plurality of UEs to transmit/receive data packets efficiently with limited resources. The resources are subcarriers in an Orthogonal Frequency Division Multiplexing (OFDM) scheme and they are spreading codes in a Direct Sequence-Code Division Multiple Access (DS-CDMA) scheme. To utilize resources for efficient data packet transmission from UEs, a Node B scheduler allocates resources to the UEs, taking into account the radio channel statuses between the UEs and the Node B, the amount of data to be transmitted, Quality of Service (QoS), and transmission delay requirements.

FIG. 1 illustrates an exemplary configuration of scheduling information on a scheduling channel that delivers resource allocation information from a Node B to a UE.

Referring to FIG. 1, a Shared Control CHannel (SCCH) 105 carries scheduling information about downlink data packets. The SCCH 105 includes a $k_0$-bit UE IDentification (ID) 100 of a scheduled user, a $k_1$-bit resource indication 101 indicating the indexes of allocated resources (Category (hereinafter, "Cat.") 1 information), a $k_2$-bit transport format 102 indicating the modulation scheme, channel coding scheme, and data size of the transmission data (Cat. 2 information), and $k_3$-bit Hybrid Automatic Repeat reQuest (HARQ) information 103 indicating the number of retransmissions, a redundancy version, and a packet ID (Cat. 3 information). The information 100 to 103 has a total of K bits 106 and channel-encoded to M bits at a code rate r=K/M (M>K) as indicated by reference numeral 104, prior to transmission on the SCCH 105.

FIG. 2 illustrates transmission of downlink scheduling channels and the camped statuses of UEs. In the illustrated case of FIG. 2, N SCCH signals 201 are transmitted in OFDM in a 10-MHz bandwidth 200 and M UEs 202 receive the SCCH signals 201.

Referring to FIG. 2, each UE 202 decodes the SCCH signals 201 and determines whether the ID of the UE 202 is included in any of the SCCH signals 201 in order to determine whether there is data scheduled for the UE 202. The frequency resources of the 10-MHz bandwidth 200 are divided into L Resource Blocks (RBs) 203.

FIG. 3 illustrates resource allocation by scheduling channels.

Referring to FIG. 3, UEs scheduled by the SCCH signals identify RBs allocated to them by the indexes of the allocated resources included in the SCCH signals. While each RB includes success subcarriers in FIG. 2, each RB may include scattered subcarriers across a wide band in OFDM in order to achieve a frequency diversity gain.

A first SCCH 300(SCCH #1) and a second SCCH 301 (SCCH #2) deliver scheduling information to an $m^{th}$ UE 302(UE #m) and a $k^{th}$ UE 303(UE #k), respectively. UE #m and UE #k identify RBs allocated to them from resource indication information 304 and 305. In the illustrated case of FIG. 3, RB #3 and RB #N are allocated to UE #m, while RB #2, RB #5 and RB #(L−1) are allocated to UE #k. UE #m and UE #k demodulate and decode data packets received in the RBs.

FIG. 4 illustrates transmission of scheduling channels and the camped statuses of UEs in a system having a system bandwidth of 20 MHz.

In a system supporting spectrum scalability, if a minimum allowed reception bandwidth for UEs is 10 MHz and a 20-MHz transmission bandwidth is given, UEs supporting 10 MHz and 20 MHz may co-exist.

Referring to FIG. 4, first and second UEs 402 and 403(UE #1 and UE #2) receive signals respectively in left and right 10-MHz bands 407 and 408 of a total 20-MHz band. Third and fourth UEs 404 and 409(UE #3 and UE #4) receive signals in the 20-MHz band. Hence, UE #1 having the 10-MHz reception bandwidth and UE #3 and UE #4 each having the 20-MHz bandwidth can receive SCCHs 400, SCCH #1.1 to SCCH #1.N carrying scheduling information about RBs 405, RB #1.1 to RB #1.L in the left 10-MHz band 407. UE #2 having the 10-MHz reception bandwidth and UE #3 and UE #4 each having the 20-MHz bandwidth can receive SCCHs 401, SCCH #2.1 to SCCH #2.N carrying scheduling information about RBs 406, RB #2.1 to RB #2.L in the right 10-MHz band 408.

If RBs of both 10-MHz bands are allocated to a UE having the 20-MHz reception bandwidth, the UE has to receive SCCH signals in the two 10-MHz bands. Even though data scheduled for the UE is transmitted in scattered RBs, data in each RB is from one channel-coded block. Therefore, each SCCH signal received in the two 10-MHz bands includes the same transport format information (Cat. 2 information) and HARQ information (Cat. 3 information), and different resource indication information (Cat. 1 information). For successful demodulation of the scheduled data, the UE should demodulate the SCCH signals received in the two 10-MHz bands. That is, if the UE fails to demodulate the SCCH signals received in at least one of the 10-MHz bands, the UE cannot successfully receive data in RBs indicated by the failed SCCH signals, resulting in decoding failure of the data. Accordingly, for the UE that is supposed to receive SCCH signals in the two 10-MHz bands to achieve a scheduling information reception performance approximate to that of a case of receiving SCCH signals in one 10-MHz band, the SCCH signals should have more transmit power in the two 10-MHz bands.

SUMMARY OF THE INVENTION

An aspect of the present invention is to address at least the problems and/or disadvantages and to provide at least the advantages described below. Accordingly, an aspect of exemplary embodiments of the present invention is to provide a method and apparatus for transmitting/receiving scheduling channels that are configured differently according to reception bandwidths of UEs so as to reduce an amount of redundant information in a system supporting spectrum scalability.

In accordance with an aspect of the present invention, there is provided a method for transmitting scheduling channel signals in a wireless communication system having a system bandwidth being an even number multiple of a minimum bandwidth of a UE, in which a scheduling bandwidth of the UE is determined, scheduling information including index information indicating resources allocated to the UE, transport format information about data to be transmitted to the UE, and HARQ information is configured if the scheduling bandwidth of the UE is equal to the system bandwidth, the scheduling information is divided into first scheduling information and second scheduling information, and each of the first scheduling information and the second scheduling information is mapped to scheduling resources corresponding to a frequency band adjacent to a center frequency of the system bandwidth and having a bandwidth equal to the minimum bandwidth of the UE, and transmitted to the UE.

In accordance with another aspect of the present invention, there is provided an apparatus of a Node B for transmitting scheduling channel signals in a wireless communication system having a system bandwidth being an even number multiple of a minimum bandwidth of a UE, in which a controller outputs a signal for controlling a generation and a mapping of scheduling information for the UE, a scheduling information generator generates the scheduling information for the UE under a control of the controller, the scheduling information including index information indicating resources allocated to the UE, transport format information about data to be transmitted to the UE, and HARQ information, a channel encoder and modulator encodes the scheduling information and divides the channel-encoded scheduling information into first scheduling information and second scheduling information, and a scheduling resource mapper maps each of the first scheduling information and the second scheduling information to scheduling resources corresponding to a frequency band adjacent to a center frequency of the system bandwidth and having a bandwidth equal to the minimum bandwidth of the UE, and transmits the mapped first and second scheduling information to the UE.

In accordance with a further aspect of the present invention, there is provided a method for receiving scheduling channel signals in a UE in a wireless communication system having a system bandwidth being an even number multiple of a minimum bandwidth of the UE, in which a band and resources in which the UE will receive the scheduling channel signals are notified, a first scheduling channel signal and a second scheduling channel signal that include index information indicating resources allocated to the UE, transport format information about data to be transmitted to the UE, and HARQ information are received in scheduling resources corresponding to a frequency band adjacent to a center frequency of the system bandwidth and having a bandwidth equal to the minimum bandwidth of the UE, if the scheduling bandwidth of the UE is equal to the system bandwidth, the index information, the transport format information, and the HARQ information are acquired by decoding the first and second scheduling channel signals, and data is received in the resources indicated by the index information and demodulating and decoded according to the transport format information and the HARQ information, if an ID included in the scheduling channel signals are identical to an ID of the UE.

In accordance with still another aspect of the present invention, there is provided an apparatus of a UE for receiving scheduling channel signals in a wireless communication system having a system bandwidth being an even number multiple of a minimum bandwidth of the UE, in which a scheduling channel signal extractor extracts scheduling channel signals from a received signal, a demodulator and decoder receives, in scheduling resources corresponding to a frequency band adjacent to a center frequency of the system bandwidth and having a bandwidth equal to the minimum bandwidth of the UE, a first scheduling channel signal and a second scheduling channel signal, and acquires index information indicating resources allocated to the UE, transport format information about data to be transmitted to the UE, and HARQ information by decoding the first and second scheduling channel signals, if the scheduling bandwidth of the UE is equal to the system bandwidth, and a data packet reception controller demodulates and decodes a data channel according to the index information, the transport format information, and the HARQ information.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4:
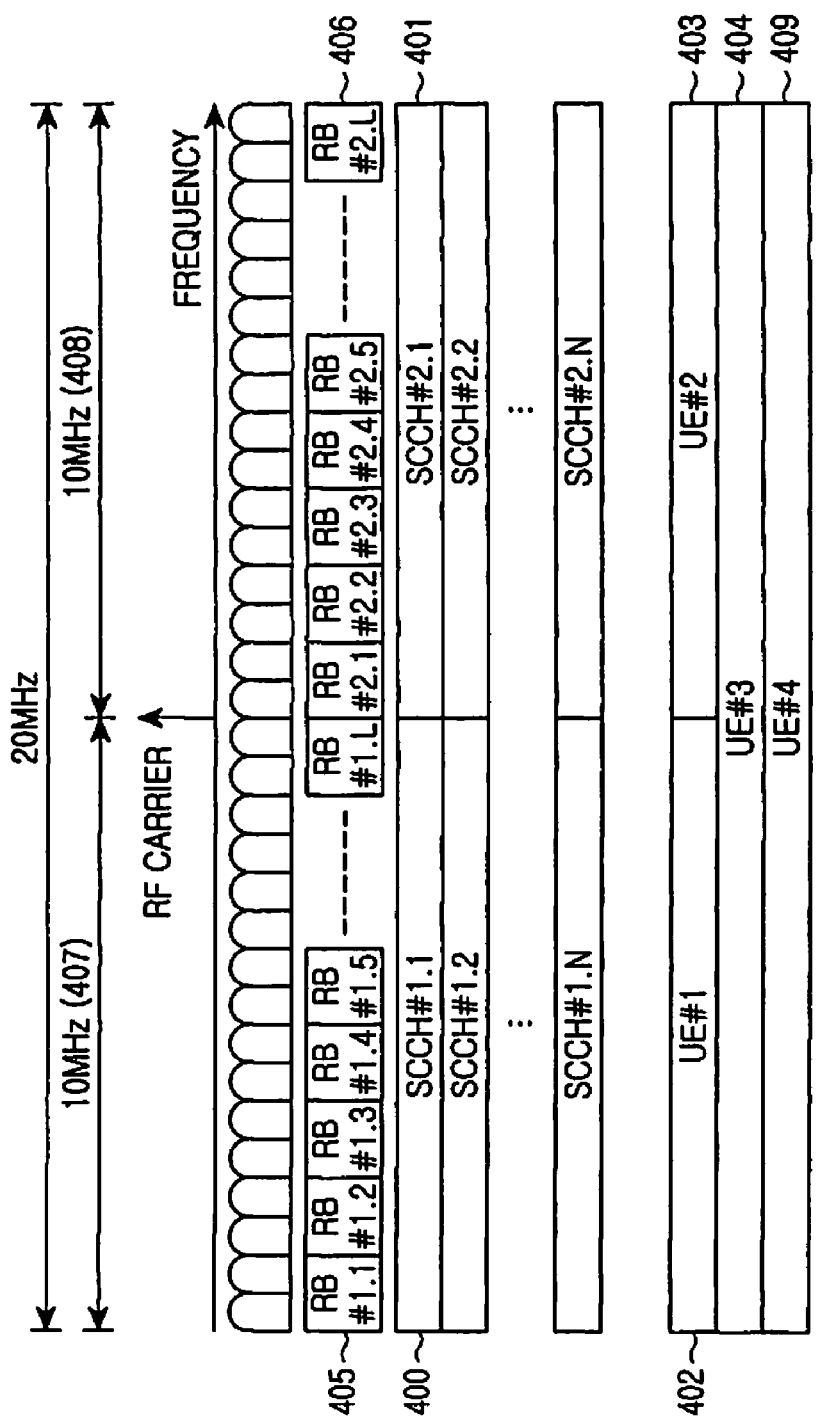
FIG. 4 illustrates transmission of downlink scheduling channels and the camped statuses of UEs in a system supporting spectrum scalability.

Exemplary embodiments of the present invention provide a method and apparatus for efficiently transmitting/receiving SCCH signals, respectively for UEs with a scheduling bandwidth equal to a system bandwidth and for UEs with a narrower scheduling bandwidth than the system bandwidth in a system supporting spectrum scalability. While the following description is made in the context of a 20-MHz system bandwidth and UEs' scheduling bandwidths of 20 MHz and 10 MHz, by way of example, it is to be understood that the present invention is also applicable to other spectrum-scalable systems. In accordance with the present invention, when a UE receives scheduling information about each of two 10-MHz bands by two SCCH signals in the two 10-MHz bands as illustrated in FIG. 4, a Node B uses a more robust channel coding scheme for the SCCH signals by avoiding transmission of redundant Cat. 2 information and Cat. 3 information in the two SCCH signals, to thereby improve the detection performance of the scheduling information included in the SCCH signals. For this purpose, the present invention defines different types of SCCHs so that an SCCH structure suitable for a given situation (for example, the maximum scheduling bandwidth of a UE) can be used. Notably, the SCCHs of the different types have the same number of physical channel bits in order to keep the reception of UEs less complex. If the SCCHs have different physical channel bits, they may be mapped to variable subcarrier positions. As a result, a different spreading gain is applied to each SCCH signal, increasing the SCCH reception complexity of UEs in DS-CDMA. Herein below, a description will be made of SCCH transmission schemes according to exemplary embodiments of the present invention.

Embodiment 1

Figure 5:
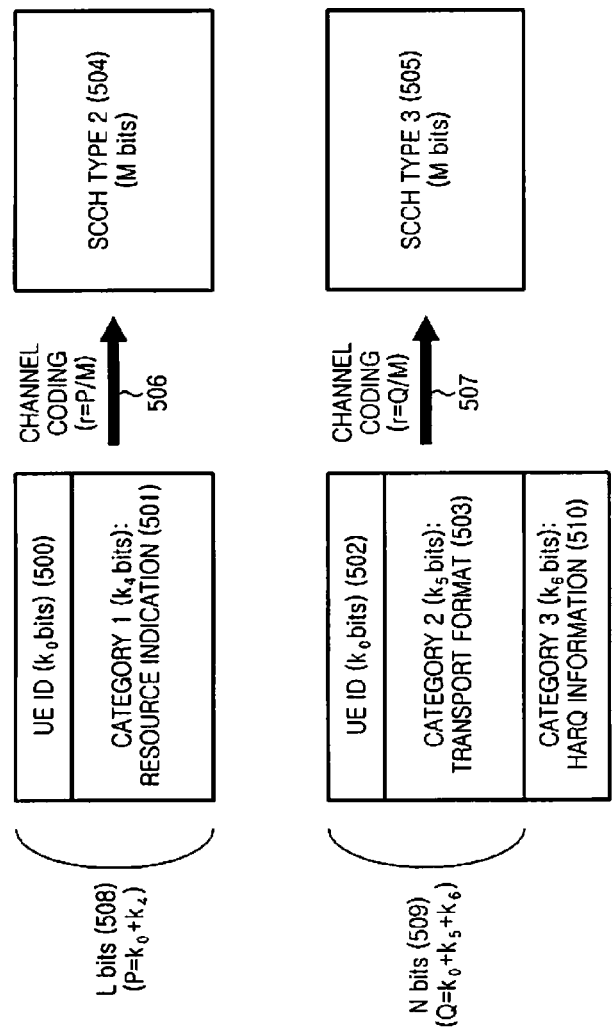
FIG. 5 illustrates SCCH structures according to a first exemplary embodiment of the present invention.

FIG. 5 illustrates SCCH structures for a UE with a maximum scheduling bandwidth of 20 MHz according to a first exemplary embodiment of the present invention.

Figure 1:
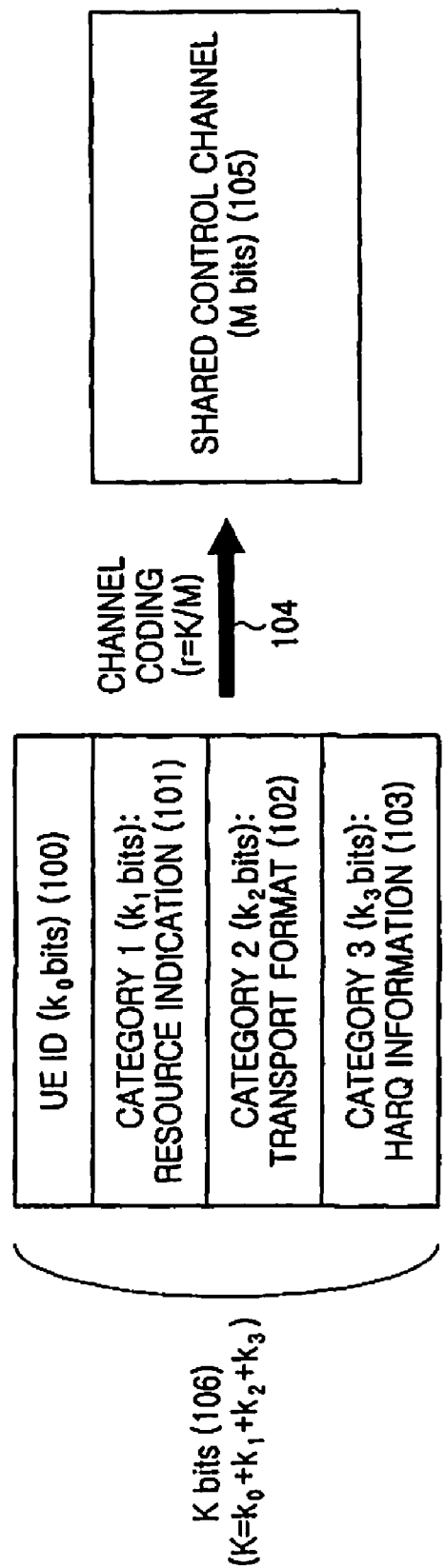
FIG. 1 illustrates the structure of a downlink scheduling channel.
Figure 2:
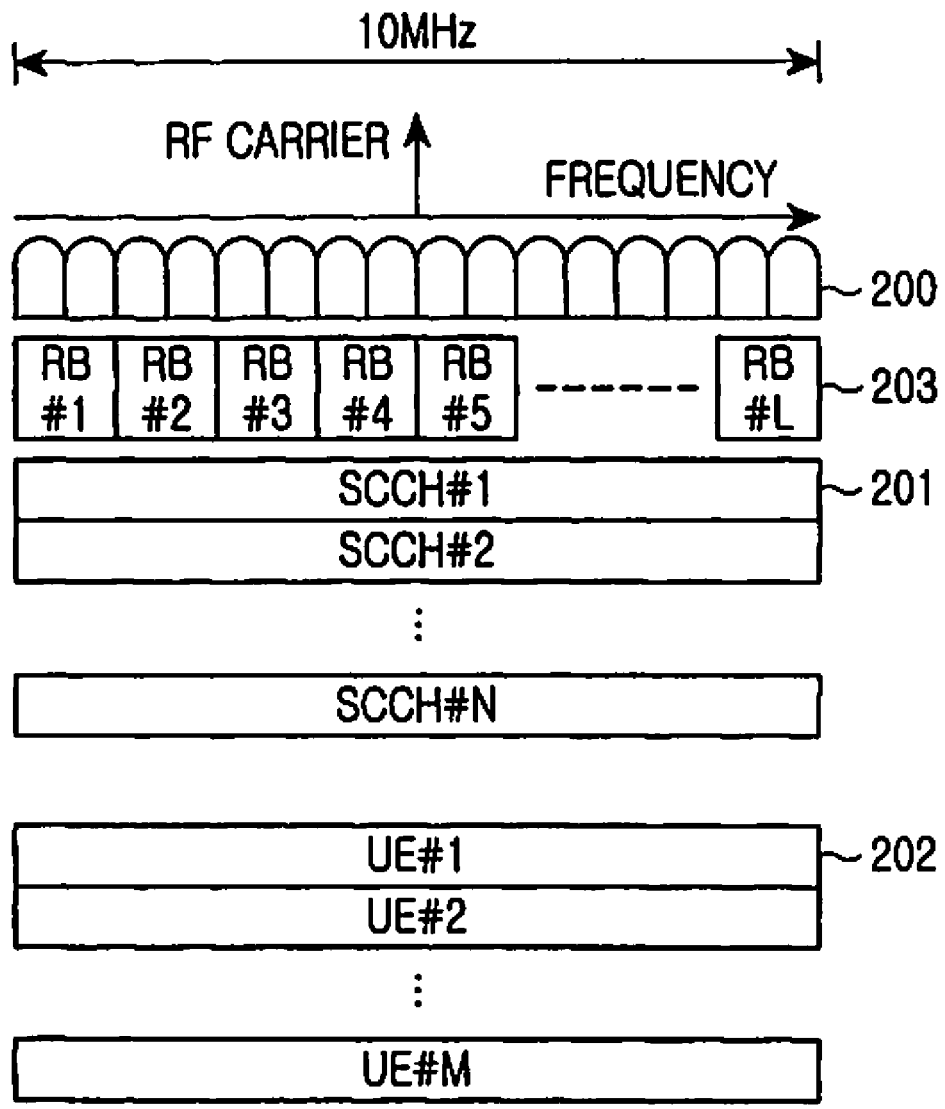
FIG. 2 illustrates transmission of downlink scheduling channels and the camped statuses of UEs.
Figure 3:
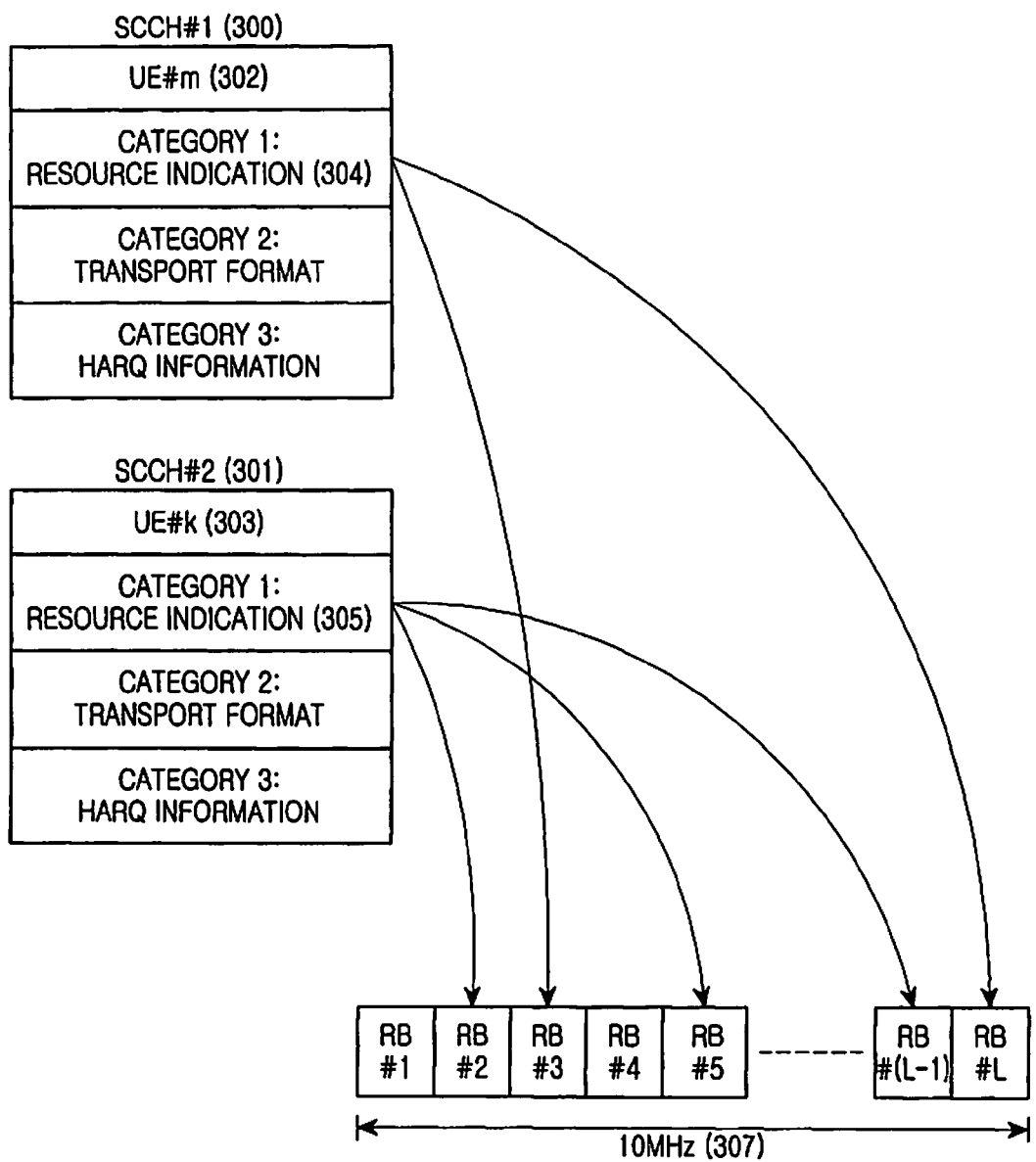
FIG. 3 illustrates resource allocation by scheduling channels.

Referring to FIG. 5, two more SCCH structures, a second SCCH type 504 (SCCH type 2) and a third SCCH type 505 (SCCH type 3) are defined in addition to the SCCH 105 (SCCH type 1) having the configuration illustrated in FIG. 1. SCCH type 2 delivers resource indication information about a band with a total bandwidth of 20 MHz, compared to the conventional SCCHs 105, 300 and 301 illustrated in FIGS. 1 and 3 that carry resource indication information about a 10-MHz band.

The SCCH type-2 signal 504 has a $k_0$-bit UE ID 500 and $k_4$-bit resource indication information 501 about the 20-MHz band. k is usually twice as large as $k_1$. The UE ID can be always $k_0$ bits in length, irrespective of whether SCCH type 1 or SCCH type 2 applies. In the present invention, the bit numbers of the scheduling information are not limited to specific values. Total P bits of the UE ID 500 and the resource indication information 501 are channel-encoded at a code rate r=P/M to the SCCH type-2 signal 504 with M bits, as indicated by reference numeral 506.

Since $k_4$ in SCCH type 2 is less than the sum of $k_1$, $k_2$ and $k_3$ in SCCH type 1, a more robust channel coding scheme can be used for Cat. 1 information 501 in SCCH type 2 than Cat. 1 information 101 in SCCH type 1.

Because SCCH type 1 and SCCH type 2 have the same number of physical channel bits, the same physical resource mapping rule applies irrespective of the SCCH types. Thus, the physical channel configuration of the system and the reception of UEs are simplified.

A UE scheduled by the SCCH type-2 signal 504 can identify RBs that will carry data packets for the UE in the 20-MHz band based on the UE ID 500 and the resource indication information 501 acquired by decoding the SCCH type-2 signal 504.

Like SCCH type 1 and SCCH type 2, SCCH type 3 has M bits. The SCCH type-3 signal 505 includes a $k_0$-bit UE ID 502, $k_5$-bit Cat. 2 information 503, and $k_6$-bit Cat. 3 information 510. When data is transmitted across the 20-MHz band, more data can be transmitted at one time than in a 10-MHz band and thus more transport formats are available. Hence, the number of bits of Cat. 2 information 503, $k_5$ can be larger than that of bits of Cat. 2 information 102 in SCCH type 1, $k_1$. The number of bits of Cat. 3 information 510, $k_5$ does not need to be equal to that of bits of Cat. 3 information 103 in SCCH type 1, $k_3$.

Total Q-bit information of SCCH type 3 is channel-encoded at a code rate r=Q/M to an M-bit SCCH type-3 signal 505, as indicated by reference numeral 507. Compared to SCCH type 1, the SCCH type-3 signal 505 does not include resource indication information. As a consequence, the total number of bits of SCCH type 3, Q is far less than that of SCCH type 1, K. Since Cat. 1 information 101 indicates whether each RB in the transmission band is used by a bitmap or in a similar manner, the total number of bits of SCCH type 3 requires as many bits as the number of RBs. Considering that every SCCH has M physical bits, a more robust channel coding scheme is adopted for the information of SCCH type 3 than for the information of SCCH type 1, thus decreasing the channel code rate from K/M in SCCH type 1 to Q/M in SCCH type 3. Accordingly, Cat. 2 information 503 and Cat. 3 information 510 can be detected from the SCCH type-3 signal 505 with improved performance.

Figure 6:
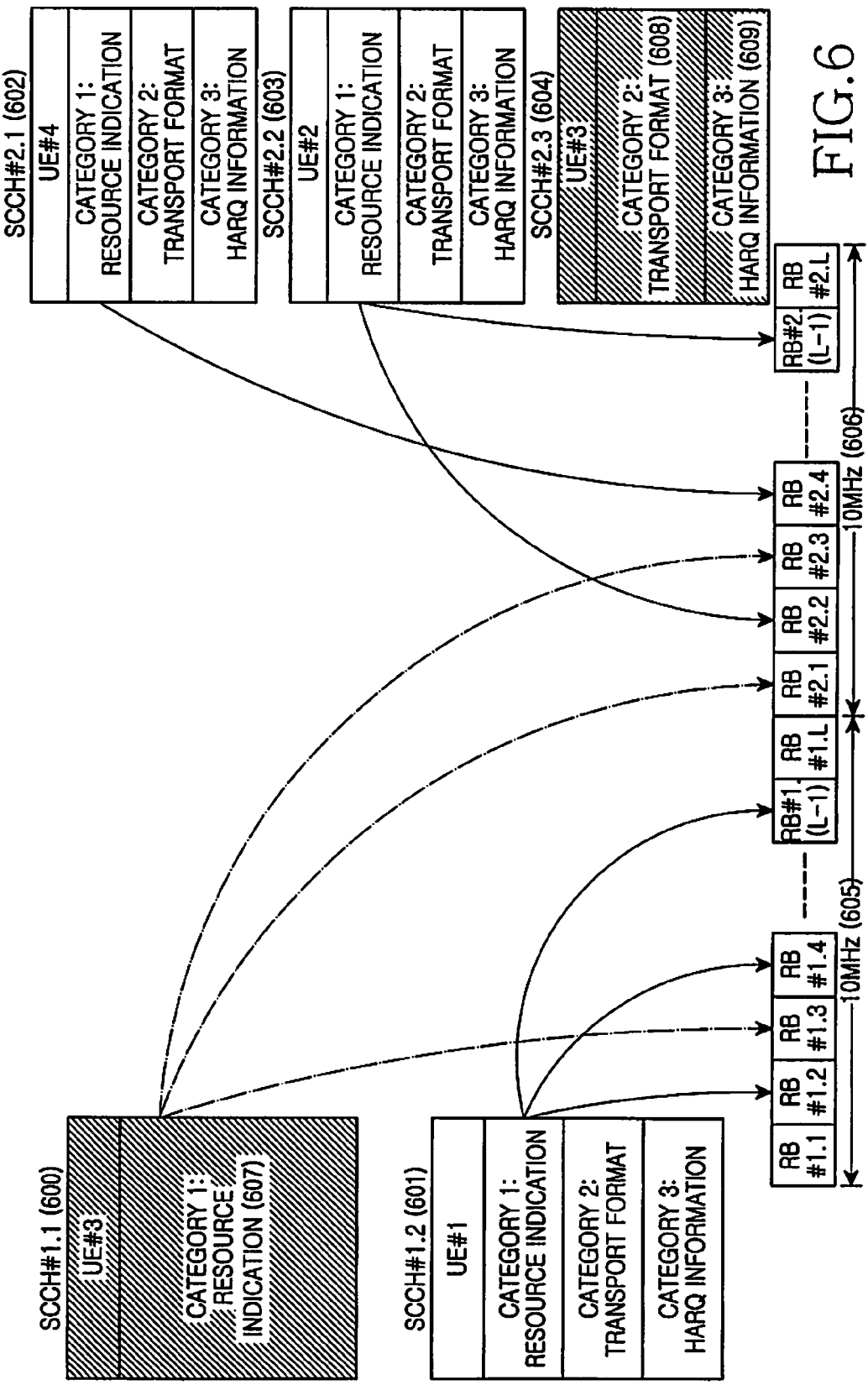
FIG. 6 illustrates scheduling by SCCHs according to the first exemplary embodiment of the present invention.

FIG. 6 illustrates scheduling by SCCHs according to the first exemplary embodiment of the present invention.

Referring to FIG. 6, when a UE is allocated RBs of a 20-MHz band, the SCCH type-2 signal 504 and the SCCH type-3 signal 505 can be transmitted separately in different 10-MHz bands. Since a more robust channel coding scheme can be used for Cat. 1 information 501, Cat. 2 information 503, and Cat. 3 information 510 relative to transmission of SCCH type-1 signals 105 in two 10-MHz bands, the UE can detect the information with excellent performance. An SCCH can be designed so that only a desired UE can succeed in a Cyclic Redundancy Check (CRC) error check during decoding the SCCH signal by masking the UE IDs 500 and 502 illustrated in FIG. 5 in a CRC rather than includes the UE IDs 500 and 502 directly in the SCCH. In this case, the present invention is also applicable.

As illustrated in FIG. 4, the SCCH signals 400, SCCH #1.1 and SCCH #1.2 are transmitted in the left 10-MHz band 407, and the SCCH signals 401, SCCH #2.1 and SCCH #2.2 are transmitted in the right 10-MHz band 408. The left 10-MHz band 407 includes the RBs 405, RB #1.1 to RB #1.L and the right 10-MHz band 408 includes the RBs 406, RB #2.1 to RB #2.L. It is assumed that UE #1 and UE #2, each using a 10-MHz reception bandwidth, are camped on the left and right 10-MHz bands 407 and 408, respectively, UE #3 having a 20-MHz reception bandwidth is allocated RBs across the 20-MHz band, and UE #4 is allocated RBs in the right 10-MHz band. If UE #4 does not need a high data rate for an on-going service and UE #3 requires a relatively high-rate data service, their scheduling bandwidths can be changed.

In FIG. 6, UE #1, UE #2 and UE #4 are allocated RBs of the 10-MHz bands on which they are camped, respectively by SCCH type-1 signals. For example, UE #1 is allocated RB #1.2, RB #1.4 and RB #1. (L−1) by an SCCH type-1 signal 601 (SCCH #1.2). Since UE #3 is scheduled over the entire 20-MHz band, UE #3 receives an SCCH type-2 signal 600 (SCCH #1.1) and an SCCH type-3 signal 604 (SCCH #2.3) in the left and right 10-MHz bands, respectively. Hence, SCCH #1.1 carries resource indication information 607 indicating that RB #1.3, RB #2.1 and RB #2.3 are allocated to UE #3, and SCCH #2.3 notifies UE #3 of the transport format 608 and HARQ information 609 of data scheduled for UE #3.

While the SCCH type-2 signal and the SCCH type-3 signal are transmitted in the two different 10-MHz bands to the UE to which RBs are allocated across the 20-MHz band in FIG. 6, both can be transmitted in one of the 10-MHz bands.

Figure 7:
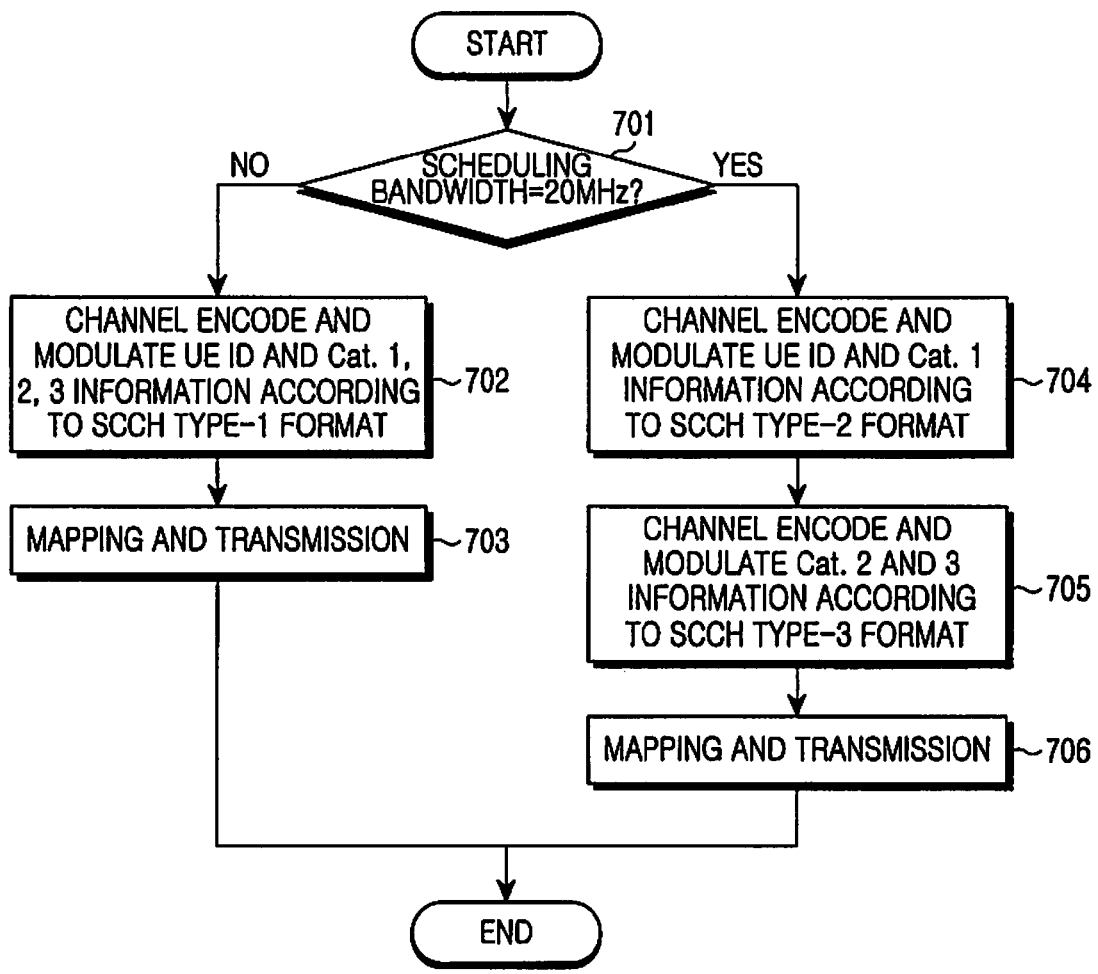
FIG. 7 is a flowchart illustrating an operation of a Node B transmitter according to the first exemplary embodiment of the present invention.

FIG. 7 is a flowchart illustrating an operation of a Node B transmitter according to the first exemplary embodiment of the present invention.

A Node B transmits to a UE an SCCH signal of a type suitable for the scheduling bandwidth of the UE. The scheduling bandwidth can be decided by higher signaling during an initial call setup between the Node B and the UE, or the scheduling bandwidth can be dynamically decided by L1/L2 scheduling. Also the Node B may determine the scheduling bandwidth for the UE in every scheduling period adaptively according to the amount of data to be transmitted to the UE, the channel status of the UE, and other factors, so that the UE can identify the scheduling bandwidth by blind detection. The present invention does not impose any restriction on the scheduling bandwidth determination.

Referring to FIG. 7, the Node B determines the scheduling bandwidth of the UE in step 701. If the maximum scheduling bandwidth of the UE is narrower than 20 MHz, the Node B channel-encodes and modulates scheduling information with a UE ID, Cat. 1 information, Cat. 2 information, and Cat. 3 information in the SCCH type-1 signal 101 in step 702. The UE ID can be directly included in the SCCH type-1 signal 101 or masked onto a CRC during the channel encoding. In step 703, the Node B maps the SCCH type-1 signal 101 to SCCH resources within a band on which the UE is camped.

However, if the scheduling bandwidth is 20 MHz, the Node B channel-encodes and modulates Cat. 1 information in the SCCH type-2 signal 504 in step 704 and channel-encodes and modulates Cat. 2 information and Cat. 3 information in the SCCH type-3 signal 505 in step 705. In step 706, the Node B maps the SCCH-type 2 signal 504 and the SCCH type-3 signal 505 to SCCH resources. The SCCH signals 504 and 505 can be transmitted in different 10-MHz bands or in the same 10-MHz band.

Figure 8:
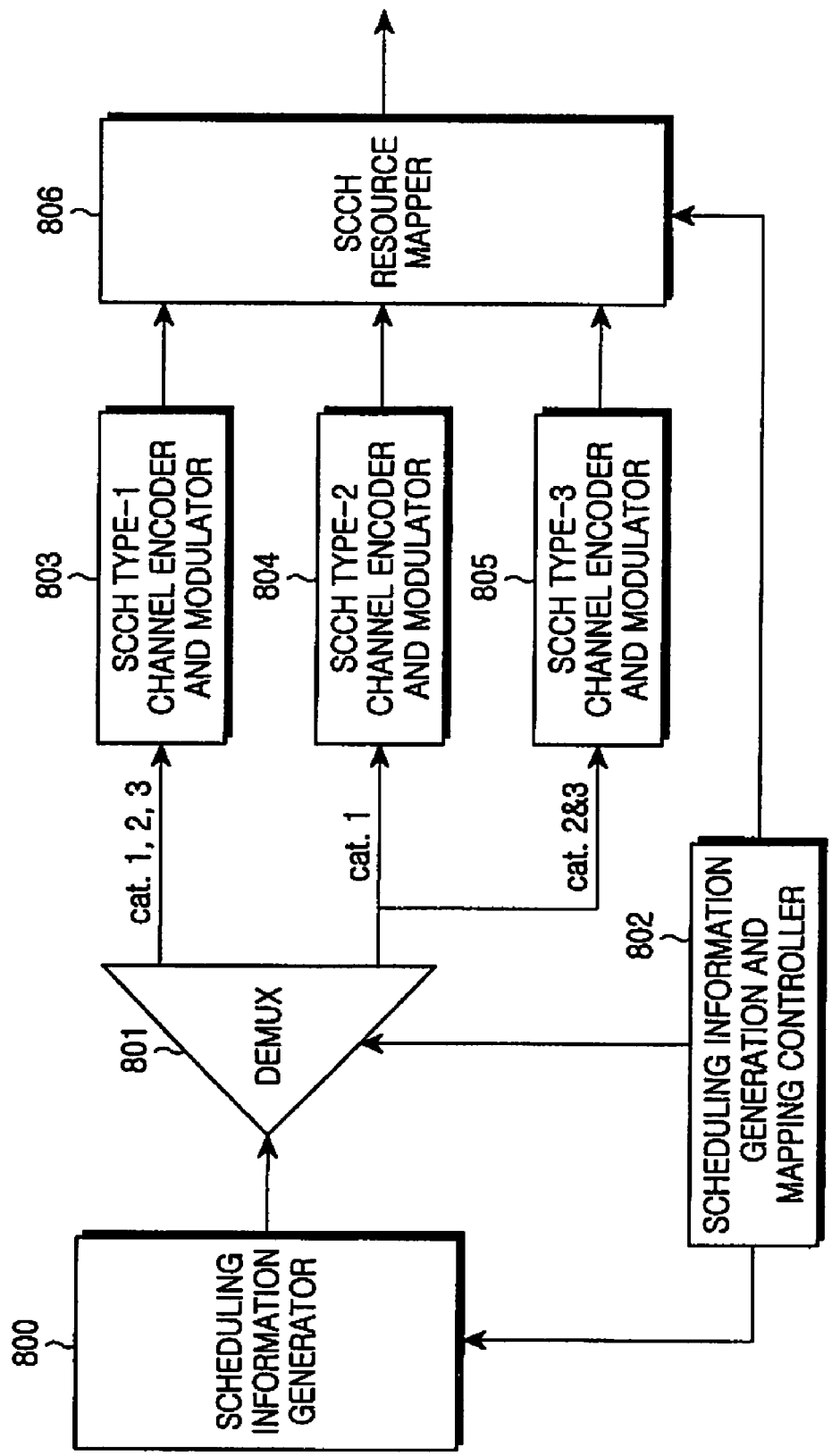
FIG. 8 is a block diagram of the Node B transmitter according to the first exemplary embodiment of the present invention.

FIG. 8 is a block diagram of the Node B transmitter according to the first exemplary embodiment of the present invention.

Referring to FIG. 8, the Node transmitter generates an SCCH signal according to scheduling information for a UE, maps the SCCH signal to resources, and transmits the SCCH signal to the UE. A scheduling information generator 800 generates the scheduling information including resource indication information (i.e. Cat. 1 information), the transport format of data (i.e. Cat. 2 information), and HARQ information (i.e. Cat. 3 information) under the control of a scheduling information generation and mapping controller 802. An SCCH type 1 channel encoder and modulator 803, an SCCH type 2 channel encoder and modulator 804, or an SCCH type 3 channel encoder and modulator 805 channel-encodes and modulates the scheduling information received through a Demultiplexer (DEMUX) 801 according to the scheduling bandwidth of the UE. An SCCH resource mapper 806 maps the SCCH modulation symbols received the channel encoder and modulator 804, 805 or 806 to SCCH resources. In an OFDM system, the SCCH modulation symbols are mapped to appropriate subcarriers in the SCCH resource mapper 806 and Inverse Fast Fourier Transform (IFFT)-processed, prior to transmission.

Figure 9:
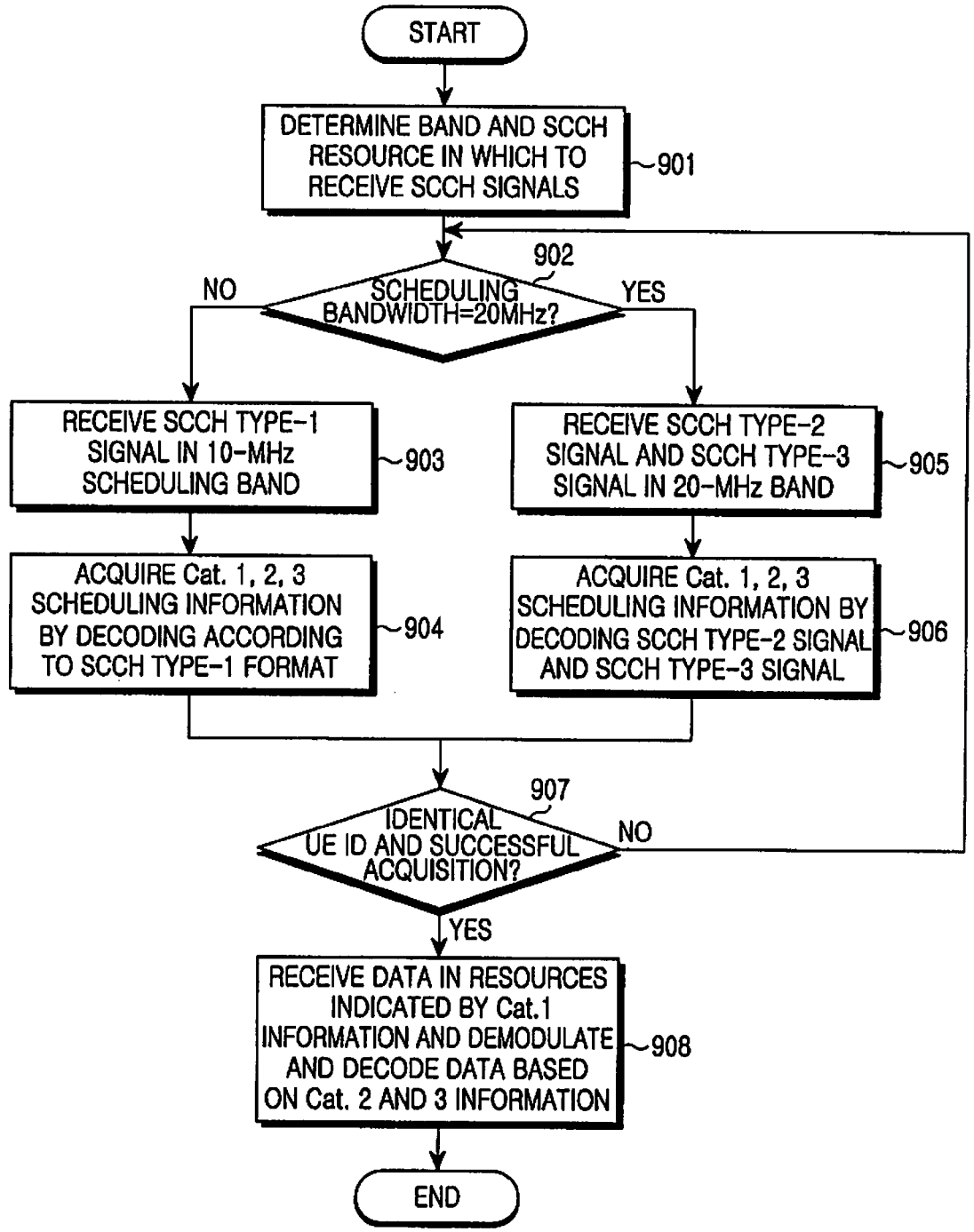
FIG. 9 is a flowchart illustrating an operation of a UE receiver according to the first exemplary embodiment of the present invention.

FIG. 9 is a flowchart illustrating an operation of a UE receiver according to the first exemplary embodiment of the present invention.

Referring to FIG. 9, the UE determines a frequency band and resources in which to receive an SCCH signal by higher signaling or dynamic L1/L2 signaling in step 901 and checks the UE's scheduling bandwidth in step 902. If the maximum scheduling bandwidth of the UE is narrower than the system bandwidth, 20 MHz, the UE receives an SCCH type-1 signal in a scheduled 10-MHz band in step 903. In step 904, the UE acquires Cat. 1 information, Cat. 2 information, and Cat. 3 information by decoding the received SCCH type-1 signal according to an SCCH type-1 channel coding format. The UE compares a received UE ID with the UE's ID and determines whether Cat. 1 information, Cat. 2 information, and Cat. 3 information have been successfully acquired in step 907. If the acquired UE ID is identical to the UE's ID and the scheduling information has been successfully acquired, the UE receives data packets in RBs indicated by Cat. 1 information and demodulates and decodes the data based on Cat. 2 information and Cat. 3 information in step 908.

However, if the maximum scheduling bandwidth of the UE is 20 MHz in step 902, the UE receives an SCCH type-2 signal and an SCCH type-3 signal in SCCH resources allocated within the 20-MHz band in step 905. In step 906, the UE acquires Cat. 1 information from the SCCH type-2 signal and Cat. 2 information and Cat. 3 information from the SCCH type-3 signal. As with the 10-MHz scheduling bandwidth, if the UE ID is identical to the ID of the UE and the UE has succeeded in acquiring all the scheduling information, i.e. Cat. 1 information, Cat. 2 information, and Cat. 3 information in step 907, the UE receives data packets in RBs indicated by Cat. 1 information and demodulates and decodes the data packets based on Cat. 2 information and Cat. 3 information in step 908. If the UE has failed in decoding at least one of the SCCH type-2 signal and the SCCH type-3 signal in step 907, the UE returns to step 902 because it is impossible to successfully receive the data packets and decode them.

Figure 10:
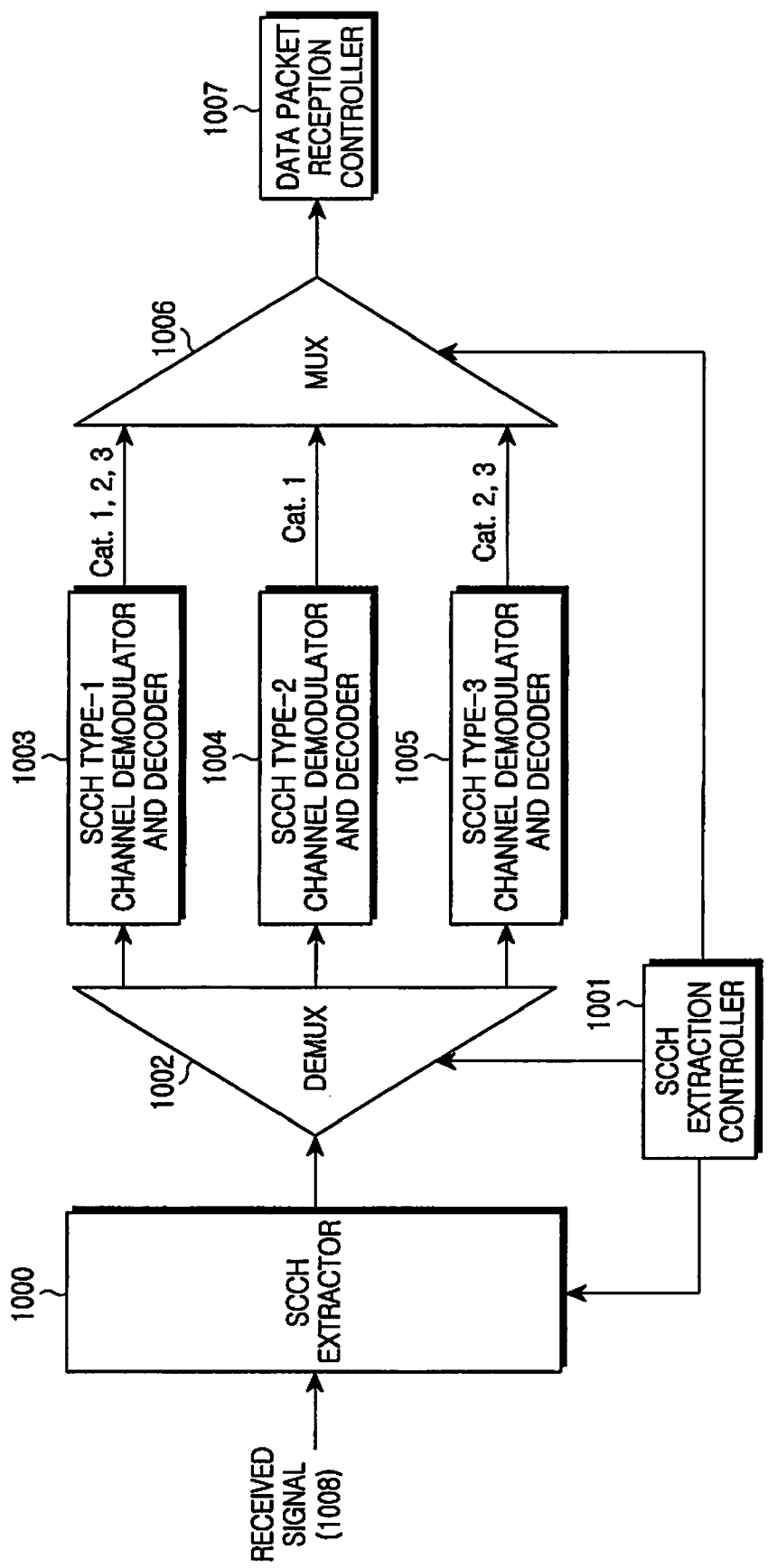
FIG. 10 is a block diagram of the UE receiver according to the first exemplary embodiment of the present invention.

FIG. 10 is a block diagram of the UE receiver according to the first exemplary embodiment of the present invention.

Referring to FIG. 10, an SCCH extractor 1000 extracts an SCCH signal from a received signal 1008 and provides the SCCH signal to one of an SCCH type-1 channel demodulator and decoder 1003, an SCCH type-2 channel demodulator and decoder 1004, and an SCCH type-3 channel demodulator and decoder 1005 through a DEMUX 1002 according to the scheduling bandwidth and SCCH reception bandwidth of the UE under the control of an SCCH extraction controller 1001. Cat. 1 information, Cat. 2 information, and Cat. 3 information acquired in the demodulators and decoders 1003, 1004 and 1005 are provided to a data packet reception controller 1007 via a MUX 1006 under the control of the SCCH extraction controller 1001. The data packet reception controller 1007 can demodulate and decode a data channel based on the acquired scheduling information.

Meanwhile, while it is described that Cat. 1 information is carried in an SCCH type-2 signal and Cat. 2 information and Cat. 3 information are carried in an SCCH type-3 signal, the Cat. 2 and Cat. 3 information can be carried in different SCCH structures. For example, SCCH type 2 includes Cat. 1 information and Cat. 3 information, and SCCH type 3 includes Cat. 2 information. The main feature of the present invention is that the channel coding gain of SCCHs is increased by avoiding redundant transmission of Cat. 1 information, Cat. 2 information, and Cat. 3 information, thereby increasing the detection performance of the scheduling information. What types of SCCHs carry which information depends on the sizes of Cat. 1 information, Cat. 2 information, and Cat. 3 information and their importance.

Figure 11:
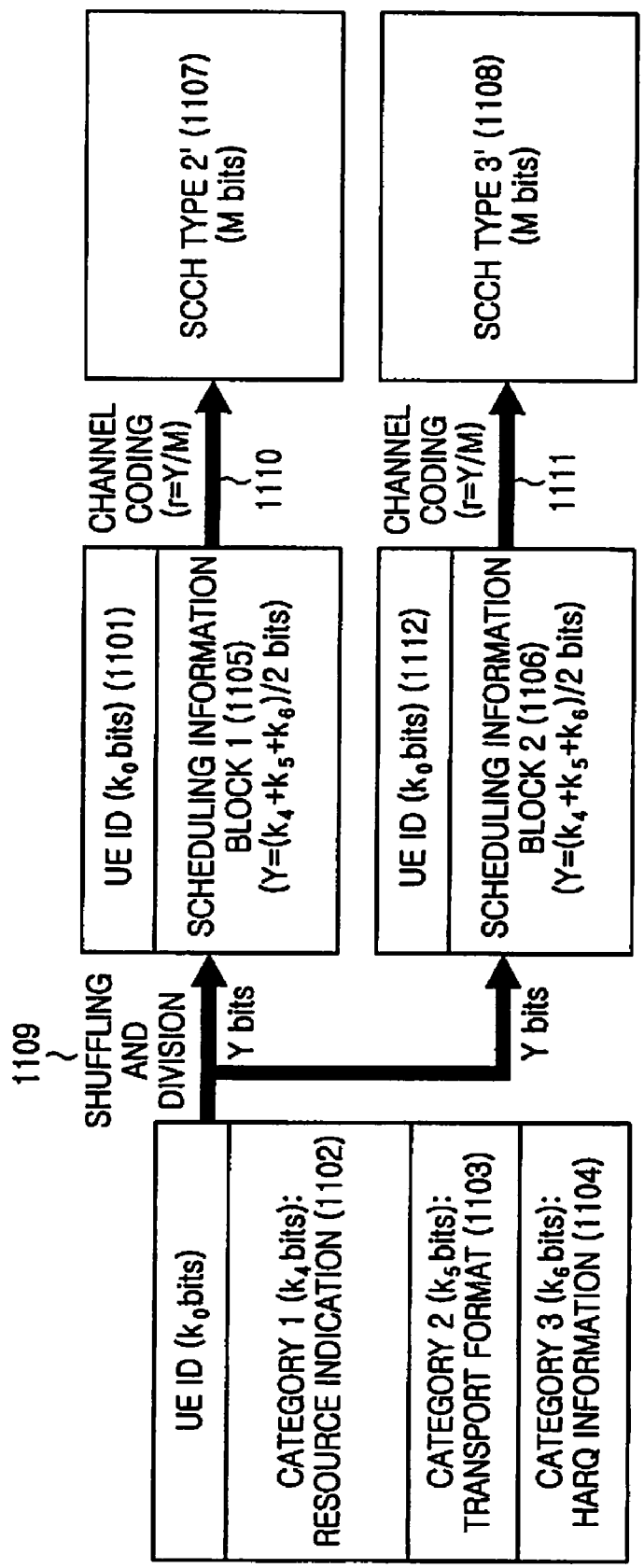
FIG. 11 illustrates another example of SCCH structures according to the first exemplary embodiment of the present invention.

FIG. 11 illustrates another example of SCCH structures according to the exemplary embodiment of the present invention.

Referring to FIG. 11, a total of 2Y (=$k_4+k_5+k_6$) bits of Cat. 1 information 1 1102, Cat. 2 information 1103, and Cat. 3 information 1104 are input in two separate information blocks 1105 and 1106 each having Y (=$k_4+k_5+k_6$) bits, as indicated by reference numeral 1109. The information blocks 1105 and 1106 are each channel-encoded with a UE ID 1101 or 1112 at a code rate r(=Y/M), thus producing an SCCH type-2' signal 1107 and an SCCH type-3' signal 1108. The UE can acquire the scheduling information, Cat. 1 information 1 1102, Cat. 2 information 1103, and Cat. 3 information 1104 by decoding the SCCH type-2' signal 1107 and the SCCH type-3' signal 1108 and combining the resulting information bits. The transmission of the same amount of information in the SCCH type-2' signal 1107 and the SCCH type-3' signal 1108 results in appropriate channel coding gains for the two SCCHs.

Embodiment 2

Figure 12:
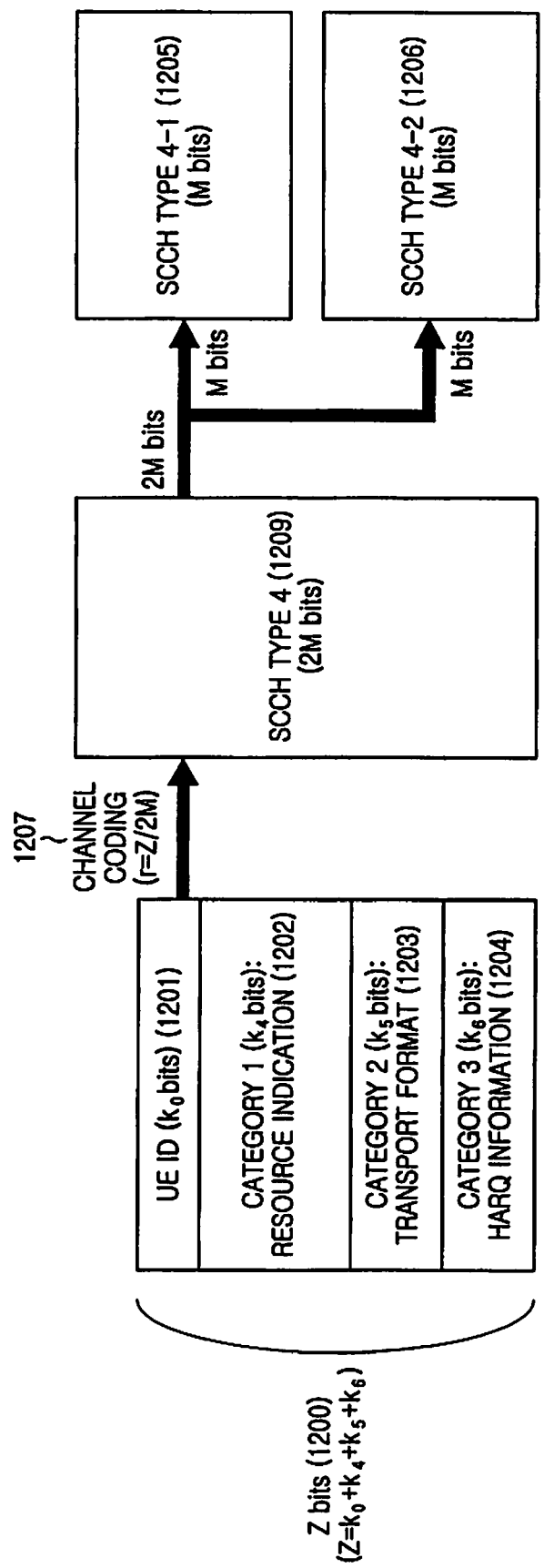
FIG. 12 illustrates SCCH structures according to a second exemplary embodiment of the present invention.

FIG. 12 illustrates SCCH structures according to a second exemplary embodiment of the present invention.

Referring to FIG. 12, compared to the SCCH structures illustrated in FIGS. 5 and 11 in which a UE ID is channel-encoded separately from Cat. 1 information, Cat. 2 information, and Cat. 3 information, a total of Z bits 1200 of a UE ID 1201, Cat. 1 information 1202, Cat. 2 information 1203, and Cat. 3 information 1204 are channel-encoded together to a total of 2 M bits of an SCCH type-4 signal 1209, as indicated by reference numeral 1207.

Since the SCCH type-4 signal 1209 has a code block size 2 M, which is twice as large as the SCCH type-2 signal 504 and the SCCH type-3 signal 505, the SCCH type-4 signal 1209 can produce as much a large channel coding gain. The SCCH type-4 signal 1209 is divided into an SCCH type 4-1 signal 1205 and an SCCH type 4-2 signal 1206 each having M bits. As the SCCH type 4-1 signal 1205 and the SCCH type 4-2 signal 1206 each have M bits like the SCCH type-1 signal 105, they can be simply mapped to SCCH resources together with other SCCH signals.

Figure 13:
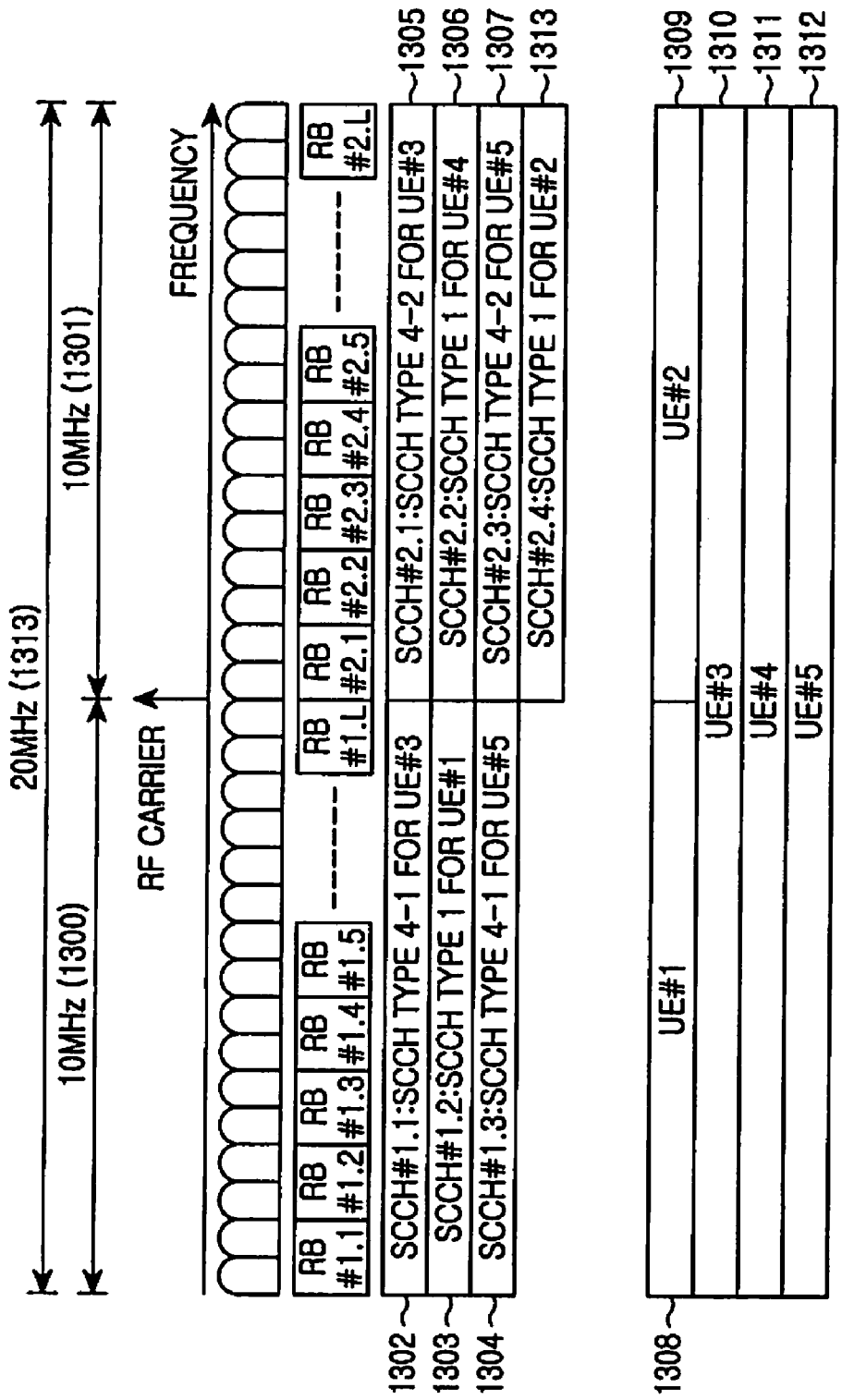
FIG. 13 illustrates scheduling by SCCHs according to the second exemplary embodiment of the present invention.

FIG. 13 illustrates a transmission of an SCCH type-1 signal, an SCCH type 4-1 signal, and an SCCH type 4-2 signal in a 20-MHz system band.

Referring to FIG. 13, an SCCH signal 1303 (SCCH #1.2) and an SCCH signal 1313 (SCCH #2.4) are of SCCH type 1 for UEs 1308 and 1309 (UE #1 and UE #2) camped on left and right 10-MHz bands 1300 and 1301, respectively. An SCCH signal 1302 (SCCH #1.1) and an SCCH signal 1305 (SCCH #2.1) are of SCCH type 4-1 and SCCH type 4-2, respectively for a UE 1310 (UE #3). UE #3 can acquire scheduling information included in the SCCH channels by combining the SCCH type 4-1 signal with the SCCH type 4-2 signal to an SCCH type-4 signal and decoding the SCCH type-4 signal. A UE 1311 (UE #4) having a reception bandwidth of 20 MHz receives scheduling information about the right 10-MHz band 1301 from an SCCH 1306 (SCCH #2.2). Since the SCCH signals are of the same size irrespective of their types, the resource mapping of the SCCH signals is simple. Thus, the UEs receive SCCH signals with indexes allocated to the UEs and determine whether the SCCH signals are scheduling channel signals for the UEs by comparing UE IDs included in the SCCH signals with their IDs.

Figure 14:
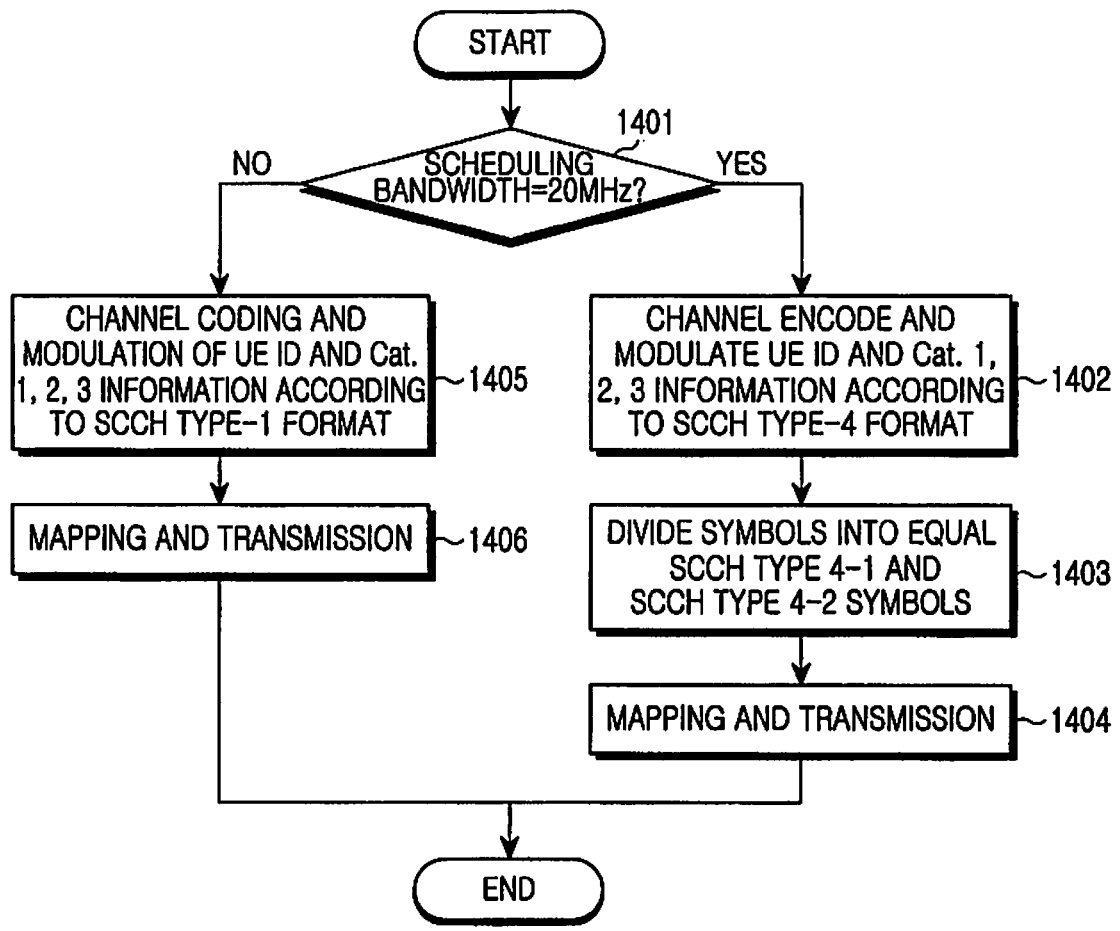
FIG. 14 is a flowchart illustrating an operation of a Node B transmitter according to the second exemplary embodiment of the present invention.

FIG. 14 is a flowchart illustrating an operation of a Node B transmitter according to the second exemplary embodiment of the present invention.

Referring to FIG. 14, when a scheduling bandwidth is equal to a system bandwidth of 20 MHz, the Node B transmitter operates differently from in the Node B transmitter of the first exemplary embodiment of the present invention illustrated in FIG. 7. That is, if the scheduling bandwidth is less than 20 MHz, the Node B transmitter operates in steps 1405 and 1406 in the same manner as steps 702 and 702 illustrated in FIG. 7.

When the UE determines that the UE's scheduling bandwidth is 20 MHz in step 1401, the UE channel-encodes a UE ID, Cat. 1 information, Cat. 2 information, and Cat. 3 information together according to an SCCH type-4 format in step 1402. In step 1403, the UE divides the resulting channel-coded block into two equal signals, the SCCH type 4-1 signal 1205 and the SCCH type 4-2 signal 1206. The UE maps the divided SCCHs to predetermined SCCH resources and transmits them in step 1404. The SCCH type 4-1 signal 1205 and the SCCH type 4-2 signal 1206 may be transmitted in different 10-MHz bands, or in the same 10-MHz band to reduce the reception complexity of the SCCHs.

Figure 15:
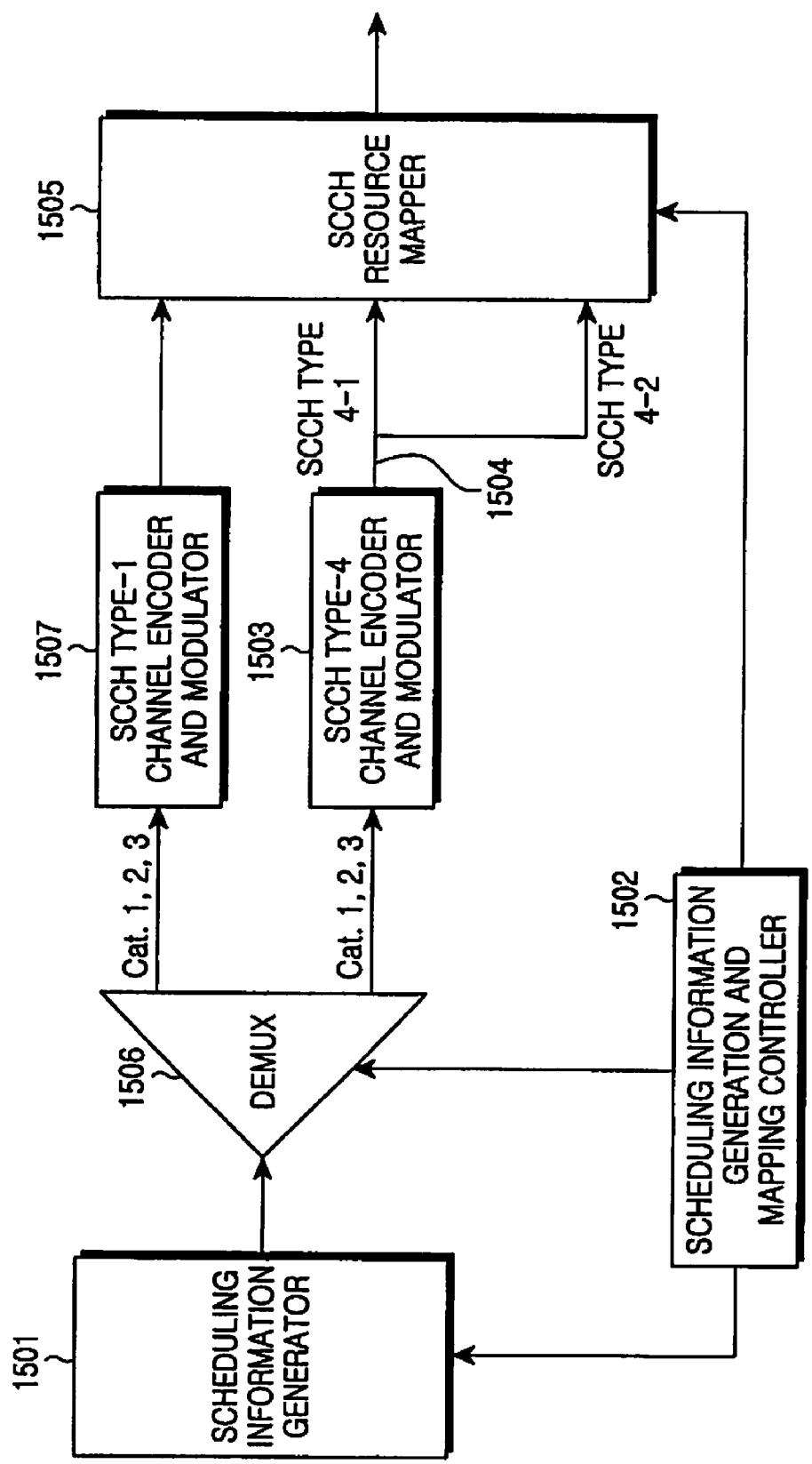
FIG. 15 is a block diagram of the Node B transmitter according to the second exemplary embodiment of the present invention.

FIG. 15 is a block diagram of the Node B transmitter according to the second exemplary embodiment of the present invention.

Referring to FIG. 15, a scheduling information generator 1501 generates scheduling information including resource indication information, the transport format of data, and HARQ information for a UE under the control of a scheduling information generation and mapping controller 1502. If the scheduling bandwidth of the UE is 10 MHz, the scheduling information is channel-encoded and modulated in an SCCH type-1 channel coder and modulator 1507 through a DEMUX 1506. The resulting SCCH modulation symbols are mapped to SCCH resources in an SCCH resource mapper 1505, prior to transmission.

If the scheduling bandwidth of the UE is 20 MHz, Cat. 1 information, Cat. 2 information, and Cat. 3 information generated from the scheduling information generator 1501 are channel-encoded and modulated in an SCCH type-4 channel encoder and modulator 1503 through the DEMUX 1506 under the control of the scheduling information generation and mapping controller 1502. The resulting modulation symbols are equally divided into SCCH type 4-1 modulation symbols and SCCH type 4-2 modulation symbols, as indicated by reference numeral 1504 and mapped to SCCH resources in the SCCH resource mapper 1505.

Figure 16:
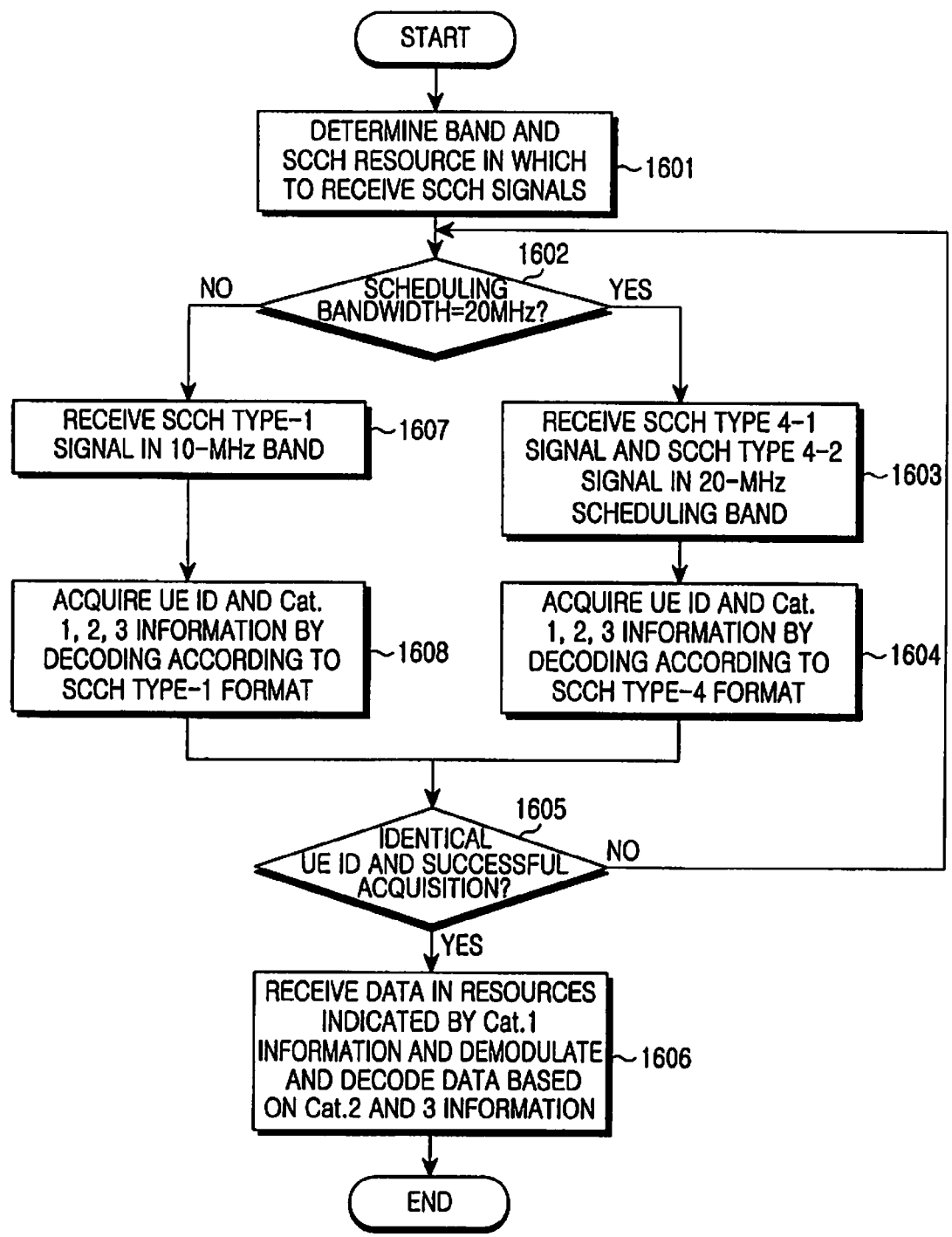
FIG. 16 is a flowchart illustrating an operation of a UE receiver according to the second exemplary embodiment of the present invention.

FIG. 16 is a flowchart illustrating an operation of a WE receiver according to the second exemplary embodiment of the present invention.

Referring to FIG. 16, when a scheduling bandwidth is a system bandwidth, 20 MHz, the UE receiver operates differently from the UE receiver illustrated in FIG. 9. That is, when the scheduling bandwidth is less than 20 MHz, steps 1607 and 1608 are performed in the same manner as steps 903 and 904 and thus the steps 1607 and 1608 will not be described herein.

The UE is notified of a frequency band and SCCH resources in which to receive an SCCH signal in step 1601 and checks the UE's scheduling bandwidth in step 1602. If the scheduling bandwidth is the system bandwidth, 20 MHz, the UE receives an SCCH type 4-1 signal and an SCCH type 4-2 signal in the SCCH resources allocated within the 20-MHz band in step 1603. In step 1604, the UE receiver combines the received SCCH symbols and acquires a UE ID, Cat. 1 information, Cat. 2 information, and Cat. 3 information by decoding the combined SCCH signal according to an SCCH type-4 channel coding format.

If the UE has successfully acquired all the scheduling information, i.e. Cat. 1 information, Cat. 2 information, and Cat. 3 information and the acquired UE ID is identical to the UE's ID in step 1605, the UE receives data packets in RBs indicated by Cat. 1 information and demodulates and decodes the received data based on Cat. 2 information and Cat. 3 information in step 1606. If the UE has failed in at least one of the SCCH type 4-1 signal and the SCCH type 4-2 signal in step 1605, it is impossible to successfully receive the data packets and decode them and thus the UE returns to step 1602.

Figure 17:
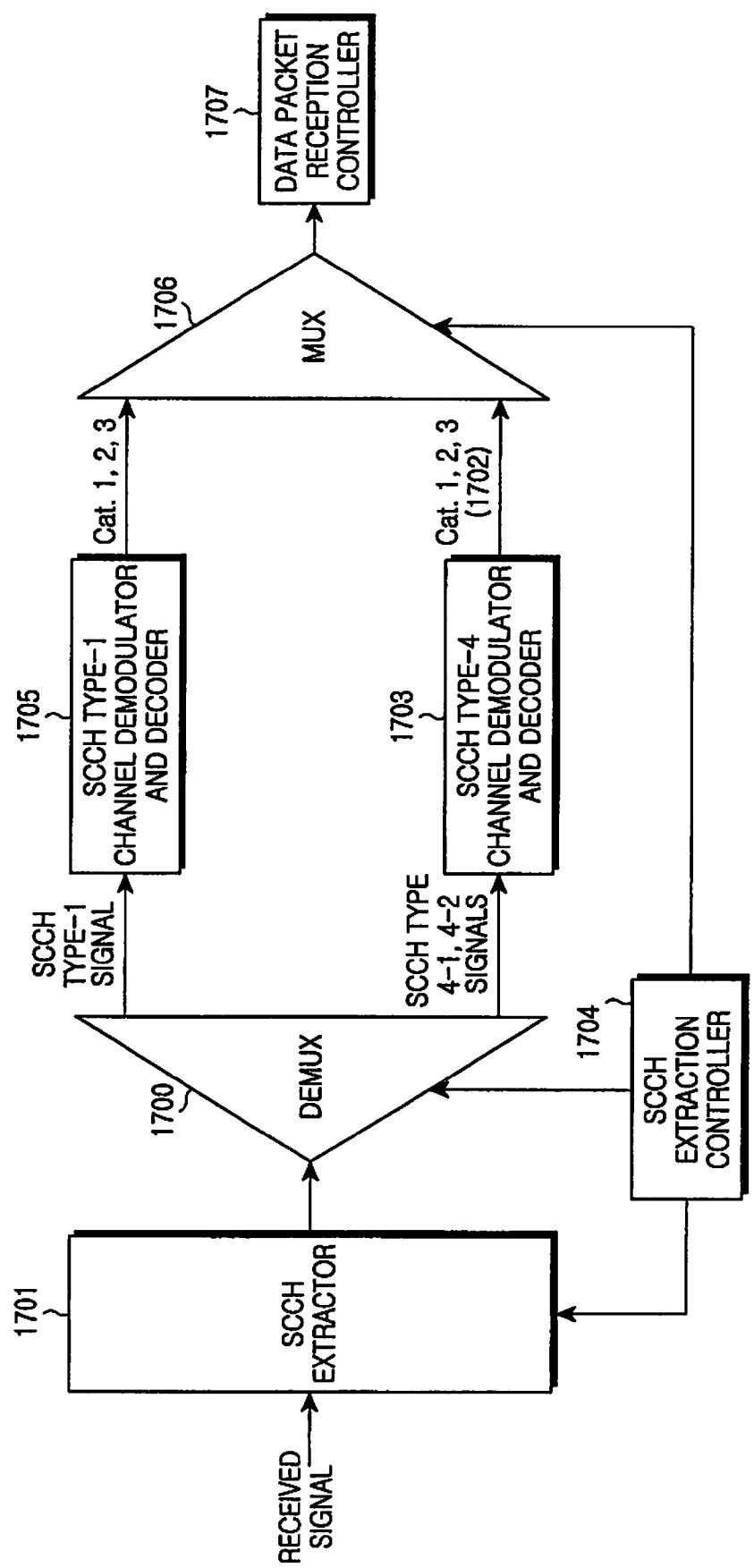
FIG. 17 is a block diagram of the UE receiver according to the second exemplary embodiment of the present invention.

FIG. 17 is a block diagram of the UE receiver according to the second exemplary embodiment of the present invention. Referring to FIG. 17, an SCCH extractor 1701 extracts an SCCH signal from a received signal. If the scheduling bandwidth of the UE is 10 MHz, less than the system bandwidth, the SCCH signal is provided to an SCCH type-1 channel demodulator and decoder 1705 via a DEMUX 1700 under the control of an SCCH extraction controller 1704. The SCCH type-1 channel demodulator and decoder 1705 acquires Cat. 1 information, Cat. 2 information, and Cat. 3 information by demodulating and decoding the SCCH signal. A data packet reception controller 1707 demodulates and decodes a data channel signal based on the acquired scheduling information received from the SCCH type-1 channel demodulator and decoder 1705 via a MUX 1706 under the control of the SCCH extraction controller 1704.

Meanwhile, if the scheduling bandwidth of the UE is the system bandwidth, 20 MHz, the SCCH extractor 1701 extracts an SCCH type 4-1 signal and an SCCH type 4-2 signal under the control of the SCCH extraction controller 1704. An SCCH type-4 channel demodulator and decoder 1703 demodulates and decodes the SCCH type 4-1 signal and the SCCH type 4-2 signal received from the SCCH signal extractor 1701 via the DEMUX 1700. If the decoding is successful, the UE can acquire all of Cat. 1 information, Cat. 2 information, and Cat. 3 information. The data packet reception controller 1707 demodulates and decodes a data channel signal based on the scheduling information received from the SCCH type-4 channel demodulator and decoder 1703 via the MUX 1706 under the control of the SCCH extraction controller 1704.

Figure 18:
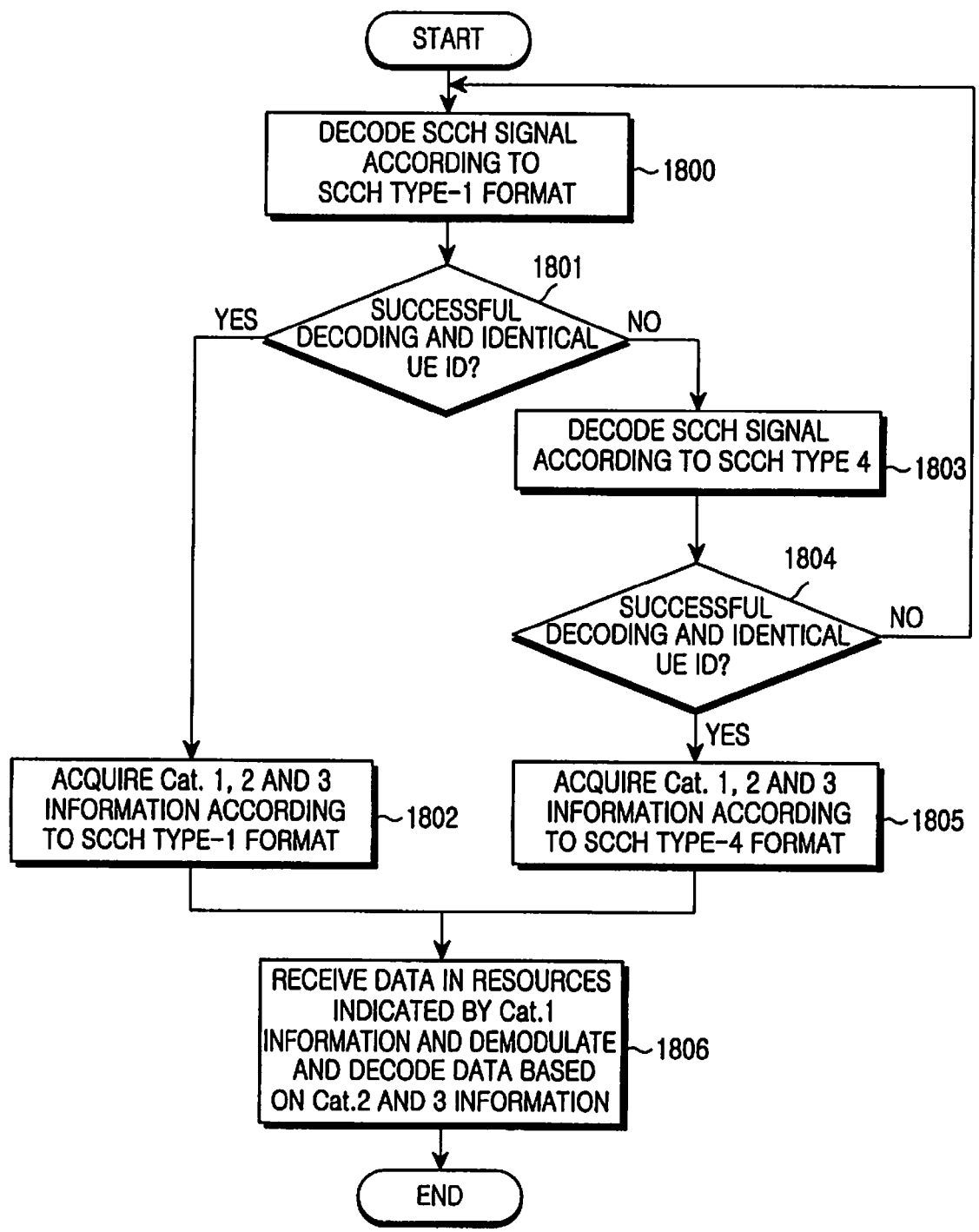
FIG. 18 is a flowchart illustrating another operation of the UE receiver according to the second exemplary embodiment of the present invention.

FIG. 18 is a flowchart illustrating another operation of the UE receiver according to the second exemplary embodiment of the present invention.

This operation is performed in a case where the UE detects an SCCH transport format by blind detection without any prior notification of the SCCH transport format.

Referring to FIG. 18, the UE decodes an SCCH signal received in allocated SCCH resources according to an SCCH type-1 format in step 1800. In step 1801, the UE compares a UE ID acquired by the decoding with the UE's ID. If the IDs are identical, the UE acquires Cat. 1 information, Cat. 2 information and Cat. 3 information according to the SCCH type-1 format in step 1802. If the IDs are different, the UE decodes the SCCH signal according to an SCCH type-4 format in step 1803. If the UE has failed in decoding or the acquired UE ID is different from the UE's ID in step 1804, the UE returns to step 1800. On the contrary, if the acquired UE ID is identical to the UE's ID, the UE acquires Cat. 1 information, Cat. 2 information and Cat. 3 information according to the SCCH type-4 format in step 1805. In step 1806, the UE receives data in resources indicated by Cat. 1 information and demodulates and decodes the received data according to Cat. 2 information and Cat. 3 information.

As is apparent from the above description, the present invention applies a more robust channel coding scheme to each of two SCCHs by avoiding redundant transmission of Cat. 2 information and Cat. 3 information in the two SCCHs, in a case where a UE receives scheduling information by receiving the two SCCHs in two 10-MHz bands. Therefore, the detection performance of the scheduling information from the SCCHs is improved.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting scheduling channel signals in a wireless communication system, comprising:
   determining a scheduling bandwidth of a User Equipment (UE);
   if the scheduling bandwidth of the UE is equal to a system bandwidth of the wireless communication system, dividing scheduling information for the UE into first scheduling information and second scheduling information, such that the first scheduling information includes a UE IDentification (ID) and first category information indicating frequency resources allocated to the UE and the second scheduling information includes the UE ID and second category information indicating a transport format, wherein the system bandwidth is an even number multiple of a minimum bandwidth of the UE; and
   transmitting the first scheduling information and the second scheduling information to the UE separately through different transmission resources.

2. The method of claim 1, wherein the first and the second scheduling information are transmitted on different subbands, each of which comprises a part of the system bandwidth.

3. The method of claim 1, wherein the first and the second scheduling information are transmitted using the different transmission resources in an identical subband.

4. The method of claim 1, wherein the second scheduling information further includes third category information indicating Hybrid Automatic Repeat reQuest (HARQ).

5. An apparatus of a Node B for transmitting scheduling channel signals in a wireless communication system, comprising:

a controller for determining a scheduling bandwidth of a User Equipment (UE);

a scheduling information generator for dividing scheduling information for the UE into first scheduling information and second scheduling information, such that the first scheduling information includes a UE IDentification (ID) and first category information indicating frequency resources allocated to the UE and the second scheduling information includes the UE ID and a second category information indicating a transport format, if the scheduling bandwidth of the UE is equal to a system bandwidth of the wireless communication system, wherein the system bandwidth is an even number multiple of a minimum bandwidth of the UE;

a transmitter for transmitting the first scheduling information and the second scheduling information to the UE separately through different transmission resources.

6. The apparatus of claim 5, wherein the first and the second scheduling information are transmitted on different subbands, each of which comprises a part of the system bandwidth.

7. The apparatus of claim 5, wherein the first and the second scheduling information are transmitted using the different transmission resources in an identical subband.

8. The apparatus of claim 5, wherein the second scheduling information further includes third category information related with Hybrid Automatic Repeat reOuest (HARQ).

9. The apparatus of claim 5, further comprising:
a channel encoder for channel encoding each of the first and second scheduling information.

10. A method for receiving scheduling channel signals in a User Equipment (UE) in a wireless communication system, comprising:

determining a scheduling bandwidth of the UE;

if the scheduling bandwidth of the UE is equal to a system bandwidth of the wireless communication system, separately receiving, through different transmission resources, scheduling information divided into first scheduling information and second scheduling information, such that the first scheduling information includes a UE IDentification (ID) and first category information indicating at least one resource allocated to the UE and the second scheduling information includes the UE ID and second category information that indicates a transport format, wherein the system bandwidth is an even number multiple of a minimum bandwidth of the UE.

11. The method of claim 10, wherein the first and the second scheduling information are transmitted on different subbands, each of which comprises a part of the system bandwidth.

12. The method of claim 10, wherein the first and the second scheduling information are transmitted using the different transmission resources in an identical subband.

13. The method of claim 10, wherein the second scheduling information further includes third category information indicating Hybrid Automatic Repeat reQuest (HARQ).

14. An apparatus of a User Equipment (UE) for receiving scheduling channel signals in a wireless communication system, comprising:

a controller for determining a scheduling bandwidth of the UE;

a receiver for separately receiving, through different transmission resources, scheduling information divided into first scheduling information and second scheduling information, such that the first scheduling information includes a UE IDentification (ID) and first category information indicating at least one resource allocated to the UE and the second scheduling information includes the UE ID and second category information indicating a transport format if the scheduling bandwidth of the UE is equal to a system bandwidth, wherein the system bandwidth is an even number multiple of a minimum bandwidth of the UE.

15. The apparatus of claim 14, wherein the first and the second scheduling information are transmitted on different subbands, each of which comprises a part of the system bandwidth.

16. The apparatus of claim 14, wherein the first and the second scheduling information are transmitted using the different transmission resources in an identical subband.

17. The method of claim 14, wherein the second scheduling information includes third category information related with Hybrid Automatic Repeat reQuest (HARQ).

* * * * *